United States Patent
Kojima et al.

(10) Patent No.: US 11,610,460 B2
(45) Date of Patent: Mar. 21, 2023

(54) APPARATUS, SYSTEM, METHOD AND STORAGE MEDIUM

(71) Applicant: Yokogawa Electric Corporation, Tokyo (JP)

(72) Inventors: Osamu Kojima, Tokyo (JP); Atsushi Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/409,831

(22) Filed: Aug. 24, 2021

(65) Prior Publication Data
US 2022/0084378 A1    Mar. 17, 2022

(30) Foreign Application Priority Data

Sep. 15, 2020 (JP) .............................. JP2020-154941

(51) Int. Cl.
| | |
|---|---|
| G08B 13/196 | (2006.01) |
| G06V 20/52 | (2022.01) |
| G06V 40/10 | (2022.01) |
| G06V 40/20 | (2022.01) |
| G08B 3/10 | (2006.01) |

(52) U.S. Cl.
CPC .......... *G08B 13/196* (2013.01); *G06V 20/52* (2022.01); *G06V 40/10* (2022.01); *G06V 40/20* (2022.01); *G08B 3/10* (2013.01)

(58) Field of Classification Search
None
See application file for complete search history.

(56) References Cited

U.S. PATENT DOCUMENTS

| | | | | |
|---|---|---|---|---|
| 8,255,006 | B1* | 8/2012 | Chavez | H04M 1/72454 |
| | | | | 455/412.2 |
| 9,830,790 | B2* | 11/2017 | Jones | H04N 7/186 |
| 10,650,651 | B1* | 5/2020 | Roberts | G08B 13/19652 |
| 10,666,913 | B1* | 5/2020 | Siminoff | G06V 40/12 |
| 11,308,333 | B1* | 4/2022 | Langford | G06V 20/52 |
| 2003/0048926 | A1* | 3/2003 | Watanabe | G06V 40/10 |
| | | | | 382/103 |

(Continued)

FOREIGN PATENT DOCUMENTS

JP    2015162232 A    9/2015

OTHER PUBLICATIONS

Extended European Search Report for European Patent Application No. 21196054.7, issued by the European Patent Office dated Feb. 8, 2022.

(Continued)

*Primary Examiner* — Ricky Chin

(57) ABSTRACT

An apparatus is provided comprising: a determination unit configured to determine a possibility of an abnormality of a subject based on images captured by a surveillance camera with an audio output function; an instruction unit configured to instruct the surveillance camera to produce audio toward the subject in response to the determination of the possibility of an abnormality; an acquisition unit configured to acquire a reaction of the subject to the audio from the surveillance camera; and a detection unit configured to detect whether the subject has an abnormality or not based on the reaction of the subject to the audio.

16 Claims, 3 Drawing Sheets

(56) References Cited

U.S. PATENT DOCUMENTS

| | | | |
|---|---|---|---|
| 2015/0179066 A1* | 6/2015 | Rider | G08G 1/04 |
| | | | 701/31.5 |
| 2017/0070657 A1 | 3/2017 | Yokomizo | |
| 2017/0293301 A1* | 10/2017 | Myslinski | H04N 7/183 |
| 2018/0005524 A1* | 1/2018 | Kildevaeld | G08G 1/0965 |
| 2018/0082554 A1 | 3/2018 | Siminoff | |
| 2018/0129885 A1* | 5/2018 | Potter | G08B 3/10 |
| 2018/0158269 A1* | 6/2018 | Friedman | G06V 40/172 |
| 2019/0095451 A1* | 3/2019 | Lehtiniemi | G06T 19/006 |
| 2019/0116450 A1* | 4/2019 | Tsingos | G10L 21/0232 |
| 2019/0156650 A1* | 5/2019 | Takagi | G08B 21/22 |
| 2019/0174246 A1* | 6/2019 | De Bruijn | A63F 13/54 |
| 2019/0278976 A1* | 9/2019 | Khadloya | G06V 20/52 |
| 2019/0327448 A1 | 10/2019 | Fu | |
| 2019/0356885 A1* | 11/2019 | Ribeiro | H04N 5/247 |
| 2020/0134151 A1* | 4/2020 | Magi | G06F 21/35 |
| 2020/0273249 A1* | 8/2020 | Leppänen | G06F 3/165 |
| 2020/0278828 A1* | 9/2020 | Murtaza | H04N 21/8106 |
| 2020/0327315 A1* | 10/2020 | Mullins | H04N 7/181 |
| 2020/0368616 A1* | 11/2020 | Delamont | A63F 13/213 |
| 2021/0231775 A1* | 7/2021 | Pezeshk | G01S 7/417 |
| 2021/0347386 A1* | 11/2021 | Katayama | G07C 9/00563 |
| 2021/0374391 A1* | 12/2021 | Jorasch | G06V 40/10 |
| 2022/0028238 A1* | 1/2022 | Sadolfo | G08B 21/22 |
| 2022/0084378 A1* | 3/2022 | Kojima | G08B 29/188 |

OTHER PUBLICATIONS

Office Action issued for counterpart Chinese Application 202111079600. 8, issued by The State Intellectual Property Office of People's Republic of China dated Nov. 10, 2022.

* cited by examiner

APPARATUS, SYSTEM, METHOD AND STORAGE MEDIUM

The contents of the following Japanese patent application(s) are incorporated herein by reference:
2020-154941 filed in JP on Sep. 15, 2020

BACKGROUND

1. Technical Field

The present invention relates to an apparatus, a system, a method, and a storage medium.

2. Related Art

Conventionally, a variety of security systems using surveillance cameras have been proposed (see, e.g., Patent Document 1).
Patent Document 1: Japanese Patent Application Publication No. 2015-162232

SUMMARY

A first aspect of the present invention provides an apparatus. The apparatus may include a determination unit configured to determine the possibility of an abnormality of a subject based on images captured by a surveillance camera with an audio output function. The apparatus may include an instruction unit configured to instruct the surveillance camera to produce audio toward the subject in response to the determination of the possible abnormality. The apparatus may include an acquisition unit configured to acquire a reaction of the subject to the audio from the surveillance camera. The apparatus may include a detection unit configured to detect that the subject has an abnormality based on the reaction of the subject to the audio.

A second aspect of the present invention provides a system. The system may include the apparatus of the first aspect. The system may include the surveillance camera configured to supply captured images to the apparatus.

A third aspect of the present invention provides a method. The method may include determining the possibility of an abnormality of the subject based on images captured by the surveillance camera with the audio output function. The method may include instructing the surveillance camera to produce audio toward the subject in response to the determination of the possible abnormality. The method may include acquiring a reaction of the subject to the audio from the surveillance camera. The method may include detecting an abnormality of the subject based on the reaction of the subject to the audio.

A fourth aspect of the present invention provides a storage medium with a program recorded therein. The program may function a computer as the determination unit configured to determine the possibility of an abnormality of the subject based on images captured by the surveillance camera with the audio output function. The program may function the computer as the instruction unit configured to instruct the surveillance camera to produce audio toward the subject in response to the determination of the possible abnormality. The program may function the computer as the acquisition unit configured to acquire a reaction of the subject to the audio from the surveillance camera. The program may function the computer as the detection unit configured to detect that the subject has an abnormality based on the reaction of the subject to the audio.

The summary clause does not necessarily describe all necessary features of the embodiments of the present invention. The present invention may also be a sub-combination of the features described above.

DESCRIPTION OF EXEMPLARY EMBODIMENTS

While the present invention will be described below by means of the embodiments, these embodiments below are not intended to limit the invention defined by the claims. All combinations of features set forth in the embodiments are not necessarily essential to the solutions of the present invention.

[1. Security System 1]

Figure 1:
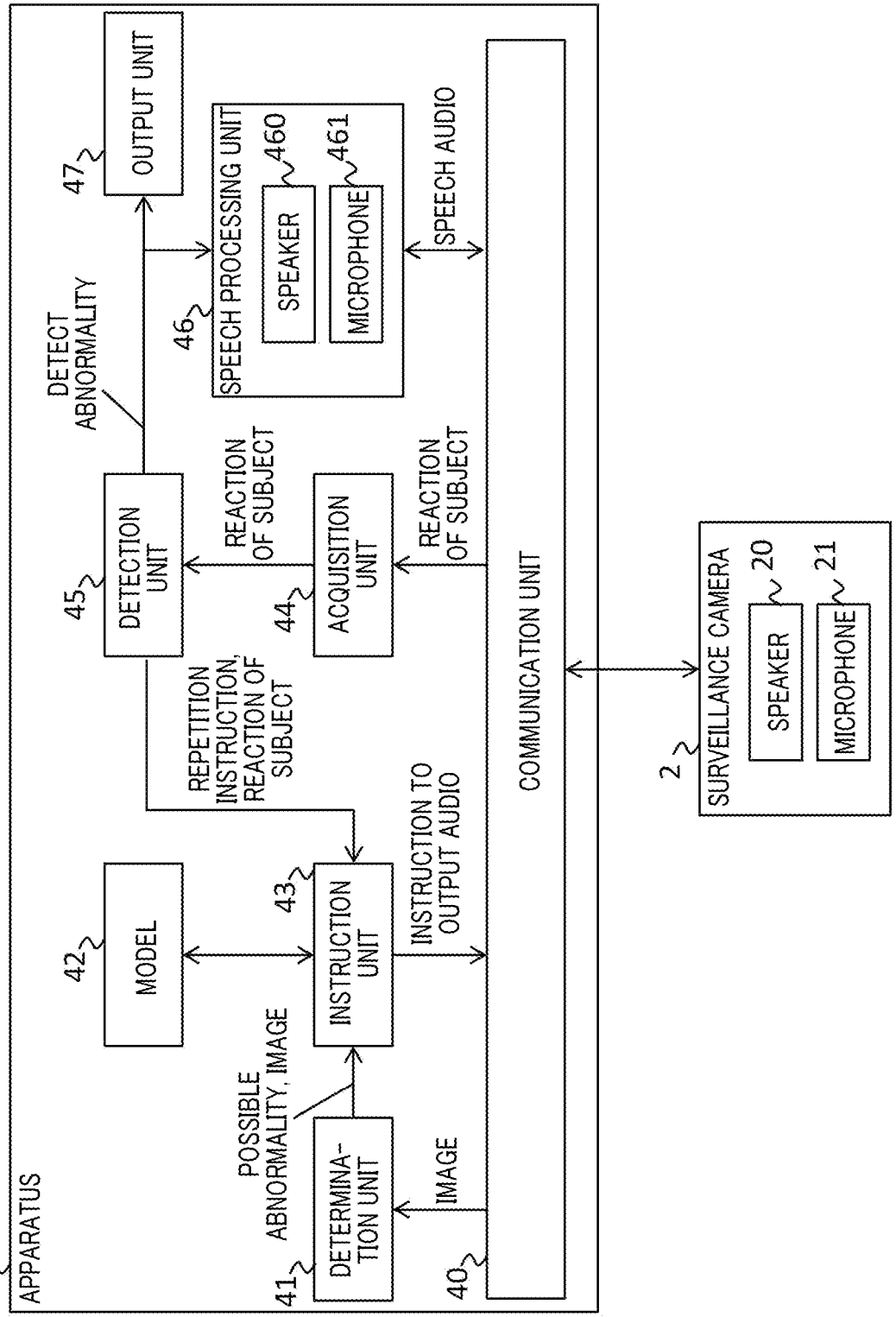
FIG. 1 shows a security system 1 according to an embodiment.

FIG. 1 shows a security system 1 according to the embodiment. The security system 1 includes a surveillance camera 2 and an apparatus 4.

In this embodiment, as an example, the surveillance camera 2 and the apparatus 4 may be connected directly or via a communication network. The communication network may be composed of various networks such as the Internet, a wide area network (WAN), and a local area network, or the combinations thereof. The communication network may include, at least one of wired or wireless, connection points. The communication network may be implemented by a dedicated line, separate from a public line such as the Internet.

[1.1. Surveillance Camera 2]

The surveillance camera 2 captures images of a surveillance area and supplies the captured images to the apparatus 4. The surveillance camera 2 may constantly capture images to produce moving images (also referred to as video). As an example, each surveillance camera 2 may capture images at 30 f/s. The surveillance camera 2 may be a visible light camera, or may be an infrared or ultraviolet light camera (as an example, an X-ray camera). The surveillance camera 2 may store the captured moving image data in an internal storage area (not shown).

The surveillance camera 2 may have a speaker 20 and be able to output audio. For example, the speaker 20 may output audio in response to an instruction by the apparatus 4. In this embodiment, as an example, the audio may include a speech sound (also referred to as voice).

In addition, the surveillance camera 2 may have a microphone 21. Here, the moving image data captured by the surveillance camera 2 may be combined with the audio data. Moreover, the surveillance camera 2 may convert the audio produced by the subject to an electric signal through the microphone 21 and supply it to the apparatus 4.

Note that the subject may be people, animals such as wildlife or livestock, or vehicles such as cars or bicycles.

The surveillance camera 2 may be disposed on roads, parking lots, street lights, utility poles, or entrances or passageways of facilities. The facilities may include plants, schools or houses, stations, airports, museums, hospitals, and shops (as an example, restaurants), or otherwise theme parks or amusement parks including their attractions. Plants include industrial plants such as chemical or bio-engineering plants, plants for managing/controlling gas or oil wellheads and surroundings, plants for managing/controlling hydroelectric, thermal, or nuclear power generation, plants for managing/controlling solar or wind energy environmental power generation, and plants for managing/controlling waterworks or dams. Entrances of facilities may include an entrance provided at a boundary between the inside and outside of the facility, or an entrance provided at a boundary between one area and another in the facility.

[1. 2. Apparatus 4]

The apparatus 4 cooperates with the surveillance camera 2 to support security services at the facility. The apparatus 4 has a communication unit 40, a determination unit 41, a model 42, an instruction unit 43, an acquisition unit 44, a detection unit 45, a speech processing unit 46, and an output unit 47.

[1. 2. 1. Communication Unit 40]

The communication unit 40 provides communication between the surveillance camera 2 and each unit of the apparatus 4.

[1. 2. 2. Determination Unit 41]

The determination unit 41 determines the possibility of an abnormality of a subject based on images captured by the surveillance camera 2. For example, the determination unit 41 may determine whether there is possibly an abnormality. The determination unit 41 may, in response to the determination of the possible abnormality, supply a signal indicating the possibility to the instruction unit 43. Also, the determination unit 41 may, in response to the determination of the possible abnormality, supply images used as the basis of the determination to the instruction unit 43.

Note that an abnormality of the subject may include, as an example, that the subject is lost, that the subject is sick, or the subject has invalidly intruded into the surveillance area of the surveillance camera 2.

[1. 2. 3. Model 42]

The model 42 outputs a signal corresponding to audio that should be produced toward the subject in response to the input of at least one of images or audio of the subject. The audio that should be produced toward the subject may be an audio that causes the subject to show a reaction to allow identifying whether the subject has an abnormality or not. In addition, the audio that should be produced toward the subject may be an audio that causes the subject to show a reaction to allow identifying whether the subject is authorized to enter the surveillance area of the surveillance camera 2. Moreover, the audio that should be produced toward the subject may be an audio that causes the subject to show a reaction to allow identifying whether the subject has entered the surveillance area without authorization intentionally or by accident. The signal corresponding to the audio that should be produced may be an identification number that indicates content of the audio, or text data converted from the audio.

Learning processing may be performed on the model 42 using learning data including at least one of the images or audio of the subject acquired from the surveillance camera 2 and audio produced by a security guard toward the subject.

Note that the model 42 may have an analysis unit configured to analyze the input images or audio, and a machine learning algorithm configured to output recommended audio in accordance with the analysis result. The analysis unit may detect an action or at least one appearance feature of the subject from the image of the subject, or may recognize the audio of the subject or the security guard to convert it into text and perform the morpheme analysis of the text to detect a plurality of morphemes. While the machine learning algorithm in this embodiment is a recurrent or time-delay neural network as an example, it may be other types of machine learning algorithm including a random forest, a gradient boosting, a logistic regression, and a support vector machine (SVM). The neural network includes nodes corresponding to the respective elements that may be detected by the analysis unit in its input layer, and may include nodes corresponding to the recommended audio in its output layer. Between the input layer and the output layer, there may be an intermediate layer (hidden layer) including one or more nodes. Learning processing may be performed on the neural network by adjusting weights on edges connecting the nodes and bias values of the output nodes.

[1. 2. 4. Instruction Unit 43]

The instruction unit 43, in response to the determination of the possibility that the subject has an abnormality, instructs the surveillance camera 2 to produce audio toward the subject. The instruction unit 43 may instruct the surveillance camera 2 automatically without operations by an operator.

The instruction unit 43 may use the model 42 to determine the audio to be produced by the surveillance camera 2. For example, the instruction unit 43 may supply at least one of the images or audio of the subject to the model 42 to acquire the signal from the model 42 corresponding to the audio to be produced. The instruction unit 43 may supply the signal acquired from the model 42 to the surveillance camera 2.

[1. 2. 5. Acquisition Unit 44]

The acquisition unit 44 acquires, from the surveillance camera 2, a reaction of the subject to the audio produced from the surveillance camera 2. The acquisition unit 44 may acquire, as the reaction of the subject, moving image data captured by the surveillance camera 2, still image data extracted from the moving image data, or audio data combined to the moving image data. The acquisition unit 44 may supply the acquired reaction to the detection unit 45.

[1. 2. 6. Detection Unit 45]

The detection unit 45 detects whether the subject has an abnormality or not based on the reaction of the subject to the audio. The detection unit 45 may, in response to the detection that the subject has an abnormality, supply a signal indicating the detection to the speech processing unit 46 and the output unit 47.

In addition, the detection unit 45 may, in response to the detection that the subject does not have an abnormality, supply a signal to instruct the instruction unit 43 to repeat the processing. Then, the processing to produce audio toward the subject via the surveillance camera 2 and the processing to acquire the reaction of the subject to the audio are performed again by the instruction unit 43 and the acquisition unit 44. In this case, the detection unit 45 may detect whether the subject has an abnormality or not based on the results of processing repeated several times by the instruction unit 43 and the acquisition unit 44 to produce audio toward the subject via the surveillance camera 2 to acquire the reaction by the subject to the audio. If the signal is supplied to the instruction unit 43 to instruct to repeat the processing, the detection unit 45 may further supply the reaction of the subject supplied from the acquisition unit 44 to the instruction unit 43.

[1. 2. 7. Speech Processing Unit 46]

The speech processing unit 46, in response to the detection by the detection unit 45 that the subject has an abnormality, initiates speech between an operator of the apparatus 4 (also referred to as a security guard) and the subject via the surveillance camera 2. The speech processing unit 46 may have a speaker 460 and a microphone 461 used for the speech.

[1. 2. 8. Output Unit 47]

The output unit 47 outputs an alert signal in response to the detection by the detection unit 45 that the subject has an abnormality. For example, the output unit 47 may display the alert signal on a monitor (not shown). In this case, the operator who has checked the alert signal on the monitor may check the images of the surveillance camera 2 and dispatch the security guard to the scene. In addition, the output unit 47 may transmit the alert signal to a predetermined destination. The destination may be a security company that has installed the surveillance camera 2, an owner or management company of the facility, or a police station or hospital of a community in which the facility locates.

[1.3. Effects Obtained From Apparatus 4]

According to the apparatus 4 described above, audio is produced by the surveillance camera 2 in response to the determination of the possibility that the subject has an abnormality, and whether the subject has an abnormality or not is detected based on the reaction of the subject toward the audio. In this manner, the subject having an abnormality can be detected quickly via the surveillance camera 2.

In addition, since the speech is initiated between the operator of the apparatus 4 and the subject via the surveillance camera 2 in response to the detection that the subject has an abnormality, the operator can immediately provide an instruction to the subject.

Moreover, since an alert signal is output in response to the detection that the subject has an abnormality, the onset of the abnormal subject can be reported immediately.

Further, since the audio to be produced by the surveillance camera 2 is determined using the model 42 trained by the learning data including at least one of the images or audio of the subject acquired from the surveillance camera 2 and audio produced by the security guard toward the subject, appropriate audio can be produced by the surveillance camera 2.

Additionally, since the detection unit 45 detects whether the subject has an abnormality or not based on the results of processing repeated several times by the acquisition unit 44 and the detection unit 45 to produce audio toward the subject via the surveillance camera 2 to acquire the reaction by the subject, the abnormal subject can be detected accurately.

[2. Operations of Apparatus 4]

Figure 2:
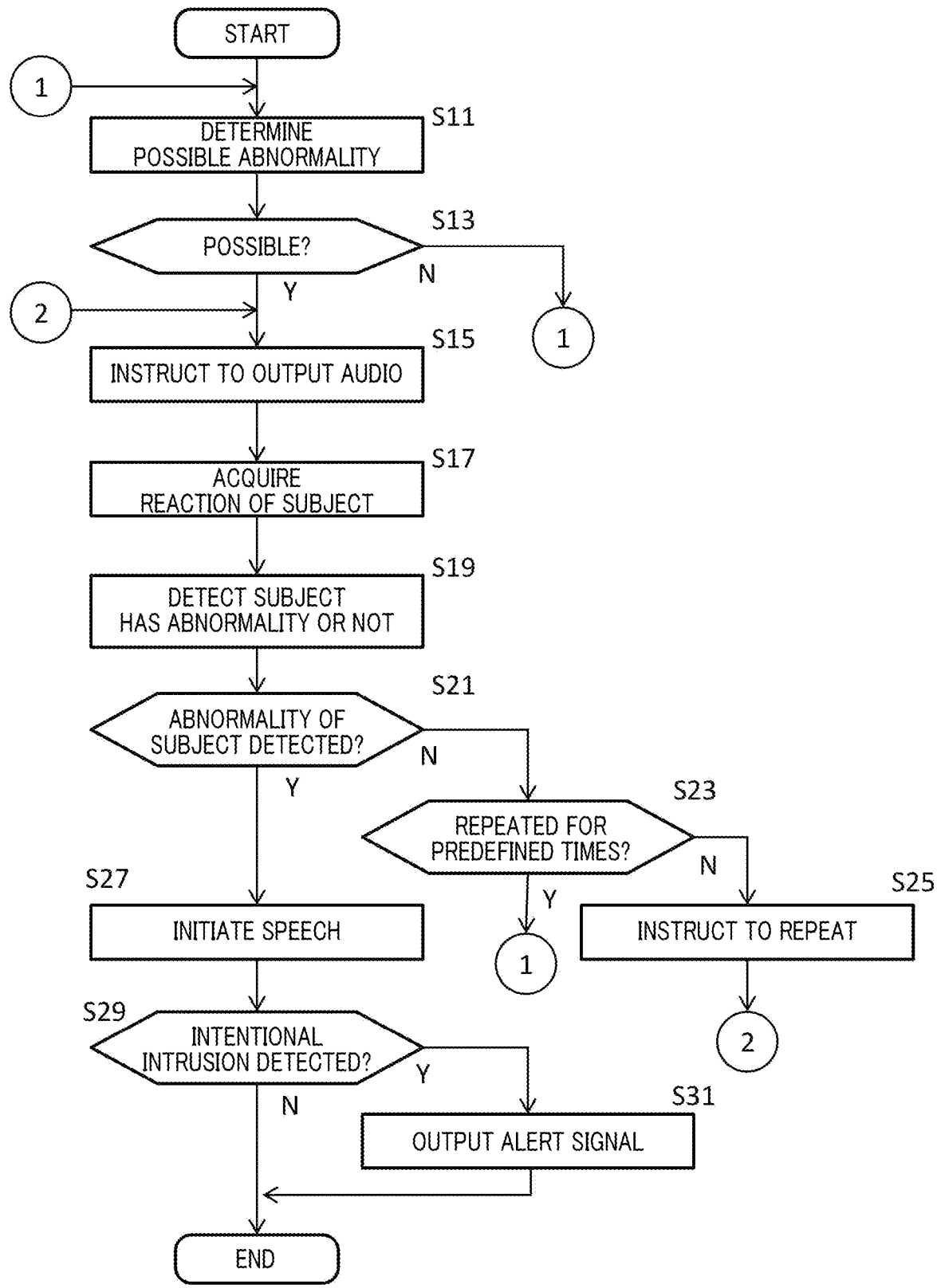
FIG. 2 shows operations of an apparatus 4.

FIG. 2 shows operations of the apparatus 4. The apparatus 4 supports security services at the facility by operating processes of Steps S11 to S31. Note that the surveillance camera 2 may capture images independently of these operations to supply moving image data sequentially to the apparatus 4.

At Step S11, the determination unit 41 determines the possibility of an abnormality of the subject based on the images captured by the surveillance camera 2.

The determination unit 41 may determine the possible abnormality based on an action of the subject detected from the moving images. For example, the determination unit 41 may determine the possible abnormality from a suspicious action of the subject different from that of other subjects. As an example, the determination unit 41 may determine the possible abnormality in accordance with the subject keeping hiding his/her face from the surveillance camera 2, moving back and forth the same place, crouching down, or keeping crying.

Additionally or alternatively, the determination unit 41 may determine the possible abnormality from appearance features of the subject detected from the still images (also referred to as frames) within the moving images. For example, the determination unit 41 may determine the possible abnormality in accordance with the detection of a crying face, a dangerous object (e.g., a knife or pistol), or a lock pick. In addition, the determination unit 41 may accumulate and store the data of the subjects that have been captured previously along with their appearance feature data to determine the possible abnormality in accordance with the detection of a subject that has never been captured before. Moreover, the determination unit 41 may determine the possible abnormality in accordance with the failure of detection of facial features of the subject because the face of the subject is covered by hair, sunglasses, a cap or hat, or a mask.

At Step S13, the apparatus 4 determines whether there is the possibility of an abnormality. If it is determined that there is the possible abnormality (Step S13; Yes), the process proceeds to Step S15. If it is determined that there is not the possible abnormality (Step S13; No), the process returns to Step S11.

At Step S15, the instruction unit 43 instructs the surveillance camera 2 to produce audio toward the subject. Then, the surveillance camera 2 produces the audio toward the subject.

Here, the audio produced by the surveillance camera 2 may be determined using the model 42. The audio produced by the surveillance camera 2 may be audio to require the subject to take a certain action. In addition, the audio produced by the surveillance camera 2 may be audio to cause the subject to show a reaction to allow identifying whether the subject is authorized to enter the surveillance area of the surveillance camera 2 or whether the subject has entered the surveillance area without authorization intentionally or by accident.

For example, the certain action may be an action to show a certificate to the surveillance camera 2. The certificate may be an employee ID card, a pass certificate, or an admission pass.

In addition, the certain action may be an action to approach the surveillance camera 2. Moreover, the certain action may be an action to utter a predetermined keyword (also referred to as an alarm word). Further, the certain action may be an action to do a predetermined gesture. The alarm word or gesture may indicate that the subject is authorized to enter the surveillance area, and may be arbitrarily set up by the security company of the facility having the surveillance camera 2 installed and provided in advance to anyone who is authorized to enter the surveillance area.

In addition, the audio produced by the surveillance camera 2 under the instruction by the instruction unit 43 may be audio that does not require the subject to take an action. For example, the audio to be produced may be audio to inform that the surveillance area is off-limits to outsiders (as an example, audio to announce that "this area is off-limits").

At Step S17, the acquisition unit 44 acquires the reaction of the subject to the audio from the surveillance camera 2. For example, the acquisition unit 44 may acquire the reaction of the subject who is required to take an action from the surveillance camera 2.

At Step S19, the detection unit 45 detects whether the subject has an abnormality or not based on the reaction of the subject to the audio. The detection unit 45 may detect that the subject has an abnormality in accordance with the reaction of the subject being abnormal. For example, the detection unit 45 may detect that the subject has an abnormality in accordance with the subject showing no reaction (as an example, the subject keeps taking the action that is determined to be possibly abnormal by the determination unit 41). Then, an abnormality of the subject may be detected when the subject cannot move due to the worsened physical condition.

When the process at Step S15 resulted in producing the audio to require the subject to take a certain action, the detection unit 45 may detect that the subject has an abnormality in accordance with the subject not taking the certain action. In addition, when the process at Step S15 resulted in producing the audio to cause the subject to show a reaction to allow identifying whether the subject is authorized to enter the surveillance area of the surveillance camera 2, the detection unit 45 may detect that the subject has an abnormality in accordance with the identification that the subject is not authorized to enter the area.

For example, when the audio is produced to require the subject to show the certificate, the detection unit 45 may detect that the subject has an abnormality if the subject refuses to show the certificate. In addition, the detection unit 45 may detect that the subject has an abnormality in accordance with the content of the certificate captured by the surveillance camera 2.

In this case, the detection unit 45 may detect that the subject has an abnormality in accordance with the content of the certificate extracted from the captured image of the certificate. For example, the detection unit 45 may detect that the subject has an abnormality if a face of the head shot on the certificate is different from the face of the subject. As an example, the detection unit 45 may determine the matching of the faces using the image analysis by extracting their facial features (e.g., positional relationships of characteristic points, or colors of eyes, skin, and hair). If accessible to a security server (not shown) storing contents of the respective certificates, the detection unit 45 may perform character recognition on the text of the captured certificate, acquire registered information of an owner of the certificate from the security server, and detect that the subject has an abnormality if the face of the subject is different from the face of the owner of the captured certificate. In addition, the detection unit 45 may detect that the subject has an abnormality if the content of the text of the captured certificate does not match the content of any certificate stored in the security server.

In addition, when the audio is produced to require the subject to utter the alarm word, the detection unit 45 may perform voice recognition on the audio produced by the subject and detect that the subject has an abnormality if the subject does not utter the correct alarm word.

When the subject is not authorized to enter the surveillance area of the surveillance camera 2, the detection unit 45 may also detect that the subject has entered the surveillance area intentionally or by accident. As an example, the detection unit 45 may detect that the subject has entered the surveillance area intentionally if the subject turns his/her face away from the surveillance camera 2 or moves away from the surveillance camera 2. Note that, at Step S19, the detection unit 45 may determine it is undetectable if the subject cannot be detected to have an abnormality or not.

At Step S21, the apparatus 4 determines whether the subject is detected to have an abnormality. If the subject is determined to have an abnormality (Step S21; Yes), the process proceeds to Step S27. If the subject is not determined to have an abnormality (Step S21; No), the process proceeds to Step S23. The subject being not determined to have an abnormality means that the subject is detected to have no abnormality or an abnormality is undetectable.

At Step S23, the detection unit 45 determines whether the process of the instruction unit 43 and the acquisition unit 44 (in this embodiment, as an example, the process of Step S15 and Step S17) has been repeated for predefined times (e.g., three times).

If it is determined that the process has been repeated for predefined times (Step S23: Yes), the process returns to Step S11. In this case, the determination unit 41 may determine the possibility of an abnormality of other subjects. If it is determined that the process has not been repeated for predefined times (Step S23; No), the process proceeds to Step S25.

At Step S25, the detection unit 45 supplies the signal to instruct the instruction unit 43 to repeat the process. Then, the process at Step S15 is repeated again, and the instruction unit 43 instructs the surveillance camera 2 to produce the audio again to the same subject. When the audio is produced to the same subject every time the process at Step S15 is performed in this manner, the audio produced at Step S15 each time may be the identical audio or may be not.

For example, the detection unit 45 may supply the reaction of the subject acquired at Step S17 to the instruction unit 43 along with the signal to instruct to repeat the process. Here, the instruction unit 43 may supply the supplied reaction of the subject to the model to acquire the signal from the model 42 corresponding to the audio to be produced. As an example, the audio to be produced at Step S15 in the first round may be audio to inform that the surveillance area is off-limits to outsiders, and the audio to be produced at Step S15 in the second round may be audio to require the subject to gesture for indicating whether the subject understands that the place where he/she is in is off-limits (as an example, audio to announce that "raise your hand if you understand").

At Step S27, the speech processing unit 46 initiates speech between the operator of the apparatus 4 and the subject via the surveillance camera 2. In this manner, the operator may give the lost subject the direction to the destination, or instruct the subject who has invalidly entered the surveillance area to stay there. Note that, in the process at Step S27, the output unit 47 may output the alert signal. In this embodiment as an example, in the process at Step S27, the output unit 47 may display the alert signal on the monitor (not shown) of the apparatus 4.

At Step 29, the apparatus 4 determines whether the subject is detected to have entered the surveillance area intentionally or by accident at Step S19. If it is detected that the subject has not entered the surveillance area intentionally, i.e., the subject has entered the surveillance area by accident (Step S29; No), the apparatus 4 terminates the operations. If it is detected that the subject has entered the surveillance area intentionally (Step S29; Yes), the process proceeds to Step S31.

At Step S31, the output unit 47 outputs the alert signal. In this embodiment as an example, in the process at Step S31, the output unit 47 may output the alert signal to the security company that has installed the surveillance camera 2 or the police station of the community in which the facility locates.

According to the operations described above, since the surveillance camera 2 is instructed to produce audio to require the subject to take a certain action, it can cause the subject to show the reaction to allow identifying whether the subject has an abnormality or not. In this manner, the abnormal subject can be detected accurately.

In addition, since the subject is detected to have an abnormality in accordance with the subject not taking a required certain action, the abnormal subject can be detected reliably.

Moreover, since the certain action required for the subject is an action to show the certificate to the surveillance camera 2, the abnormal subject can be detected who has invalidly intruded into the surveillance area without a certificate.

Further, since an abnormality of the subject is detected in accordance with the content of the captured certificate, the abnormal subject can be detected who has invalidly intruded into the surveillance area without a valid certificate.

Additionally, since the certain action required for the subject is an action to approach the surveillance camera 2, the abnormal subject can be detected reliably who is refused to be captured by a camera.

In addition, since it is detected that the subject has an abnormality in accordance with the subject not being authorized to enter the surveillance area and further detected whether the subject has entered the surveillance area either intentionally or by accident, the subject can be detected who has intruded into the surveillance area intentionally.

[3. Variations]

Note that while in the embodiments described above the speech processing unit 46 has been described to initiate the speech in response to the subject being detected to have an abnormality, the speech may be initiated by an operation by the operator at an arbitrary timing (as an example, when the operator determines that the subject has an abnormality).

In addition, the apparatus 4 has been described to have the trained model 42, it may further have a learning processing unit configured to perform leaning processing of the model 42. The learning processing unit may perform the learning processing of the model 42 using at least one of the images or audio of the subject acquired from the surveillance camera 2 when the operator determines that the subject has an abnormality to initiate the speech, and learning data including the audio produced by the operator for the subject. The images or audio of the subject included in the learning data may be images based on which the determination is made that the subject has an abnormality (as an example, images captured when the speech is initiated), or may be images or audio indicating the reaction of the subject to the audio produced by the operator.

In addition, while the apparatus 4 has been described to have the model 42, it may not have the model 42. In this case, the instruction unit 43 may determine the audio to be produced by the surveillance camera 2 using the model 42 externally connected to the apparatus 4. Alternatively, the audio to be produced by the surveillance camera 2 may be determined in advance.

In addition, while the apparatus 4 has been described to have the speech processing unit 46 and the output unit 47, it may not have these units. In this case, the apparatus 4 may store therein the images of the subject detected to have an abnormality.

In addition, while the instruction unit 43 has been described to instruct the surveillance camera 2 to produce the audio as speech, or the speech sound, it may instruct the surveillance camera 2 to produce non-speech sound. For example, the instruction unit 43 may instruct the surveillance camera 2 to produce an alarm sound. Even in this case, the subject can be instructed to show the reaction to allow identifying whether the subject has an abnormality or not, so that the abnormal subject can be detected accurately.

Various embodiments of the present invention may be described with reference to the flowchart and block diagrams, wherein the blocks may represent: (1) steps of a process for performing operations; or (2) sections of an apparatus having functions to perform operations. A specific step or section may be implemented by a dedicated circuit, a programmable circuit provided with computer-readable instructions stored on a computer-readable medium, and/or a processor provided with computer-readable instructions stored on a computer-readable medium. The dedicated circuit may include a digital and/or analog hardware circuit, or may include an integrated circuit (IC) and/or a discrete circuit. The programmable circuit may include a reconfigurable hardware circuit, including logic operations such as logic AND, logic OR, logic XOR, logic NAND, logic NOR, and the like, as well as memory elements such as a flip-flop, a register, a field programmable gate array (FPGA), and a programmable logic array (PLA).

The computer-readable medium may include any tangible device that can store instructions to be performed by a suitable device, so that the computer-readable medium having instructions stored therein comprises a product including instructions that can be executed to configure means for performing operations specified in the flowchart or block diagrams. Examples of the computer-readable medium may include an electronic storage medium, a magnetic storage medium, an optical storage medium, a magneto-electric storage medium, and a semiconductor storage medium. More specific examples of the computer-readable medium may include a floppy (registered trademark) disk, a diskette, a random access memory (RAM), a read-only memory (ROM), an erasable programmable read-only memory (EPROM or flash memory), an electrically-erasable programmable read-only memory (EEPROM), a static random access memory (SRAM), a compact disc read-only memory (CD-ROM), a digital versatile disk (DVD), a Blu-ray (registered trademark) disk, a memory stick, and an integrated circuit card.

The computer-readable instructions may include assembler instructions, instruction set architecture (ISA) instructions, machine instructions, machine-dependent instructions, microcodes, firmware instructions, state setting data, or any of source codes or object codes described in any combination of one or more programming languages, including object-oriented programming languages, such as Smalltalk, JAVA (registered trademark), or C++, and conventional procedural programming languages, such as C programming languages or similar programming languages.

The computer-readable instructions may be provided to processors or programmable circuits of general-purpose computers, special-purpose computers, or other programmable data processing apparatuses, locally or via local area network (LAN) or wide area network (WAN) such as the Internet, wherein the computer-readable instructions are executed for configuring means for performing the operations specified in the flowchart or block diagrams. The processors include a computer processor, a processing unit, a microprocessor, a digital signal processor, a controller, and a microcontroller.

Figure 3:
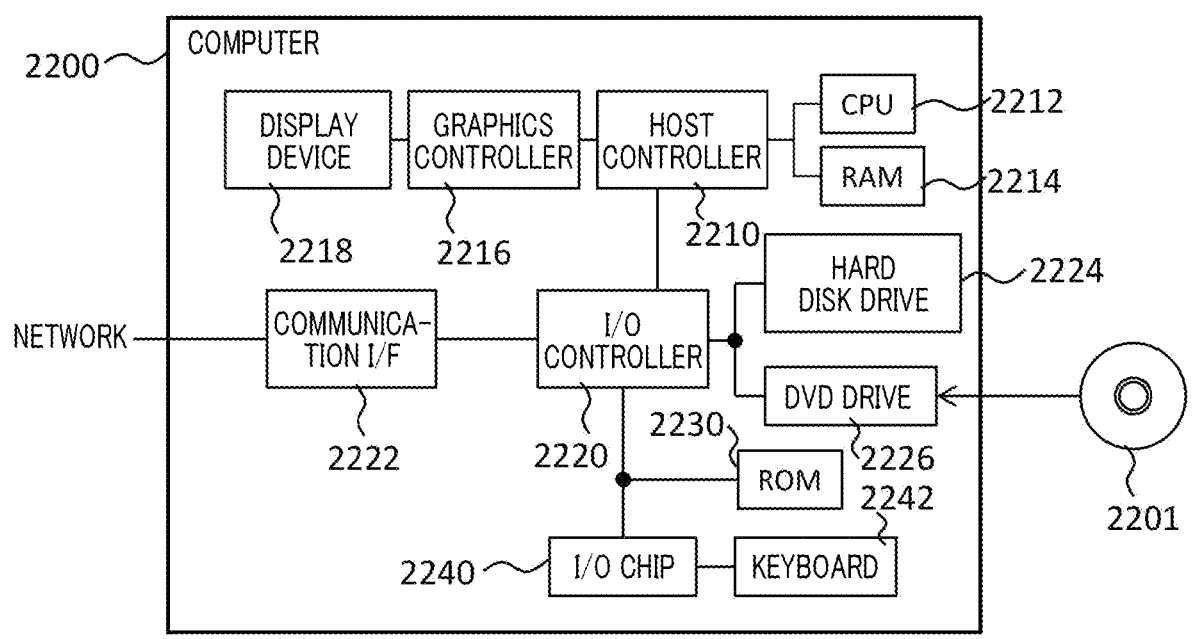
FIG. 3 shows an exemplary computer 2200 in which several aspects of the present invention may be wholly or partially embodied.

FIG. 3 shows an exemplary computer 2200 in which several aspects of the present invention may be wholly or partially embodied. A program installed in the computer 2200 can cause the computer 2200 to perform operations associated with the apparatus according to the embodiments of the present invention or function as one or more sections of the apparatus, or cause the computer 2200 to perform the operations or the one or more sections, and/or cause the computer 2200 to perform a process or steps of the process according to the embodiments of the present invention. Such a program may be executed by a CPU 2212 to cause the computer 2200 to perform specific operations associated with some or all of the blocks in the flowchart and block diagrams described in the specification.

The computer 2200 according to the present embodiment includes the CPU 2212, a RAM 2214, a graphics controller 2216, and a display device 2218, which are connected to each other via a host controller 2210. The computer 2200 also includes a communication interface 2222, a hard disk drive 2224, a DVD-ROM drive 2226, and an I/O unit such as an IC card drive, which are connected to the host controller 2210 via an I/O controller 2220. The computer further includes a legacy I/O unit such as a ROM 2230 and a keyboard 2242, which are connected to the I/O controller 2220 via an I/O chip 2240.

The CPU 2212 operates in accordance with a program stored in the ROM 2230 and the RAM 2214, thereby controlling each unit. The graphics controller 2216 obtains image data generated by the CPU 2212 in a frame buffer or the like provided in the RAM 2214 or in the RAM 2214 itself, so that the image data is displayed on the display device 2218.

The communication interface 2222 communicates with other electronic devices via a network. The hard disk drive 2224 stores a program and data used by the CPU 2212 in the computer 2200. The DVD-ROM drive 2226 reads out a program or data from a DVD-ROM 2201, and provides the program or data to the hard disk drive 2224 via the RAM 2214. The IC card drive reads out a program or data from an IC card, and/or write a program or data in the IC card.

The ROM 2230 stores a boot program or the like executed by the computer 2200 upon activation, and/or a program dependent on hardware of the computer 2200. The I/O chip 2240 may also connect various I/O units to the I/O controller 2220 via a parallel port, a serial port, a keyboard port, a mouse port, or the like.

A program is provided to a computer-readable medium such as the DVD-ROM 2201 or IC card. The program is read out from the computer-readable medium, installed in the hard disk drive 2224, the RAM 2214, or the ROM 2230 serving also as an example of the computer-readable medium, and executed by the CPU 2212. Such a program describes information processing, which is read out by the computer 2200 to link the program with the various types of hardware resources as mentioned above. The apparatus or method may be configured by implementing information operation or processing using the computer 2200.

For example, upon communication between the computer 2200 and an external device, the CPU 2212 may execute a communication program loaded in the RAM 2214 and, based on the processing described in the communication program, instruct the communication interface 2222 to perform communication processing. The communication interface 2222, under control of the CPU 2212, reads out transmission data stored in a transmission buffer processing area provided in a recording medium such as the RAM 2214, the hard disk drive 2224, the DVD-ROM 2201, or the IC card, and transmits the read-out transmission data to a network, or otherwise writes received data from the network in a reception buffer processing area or the like provided in the recording medium.

The CPU 2212 may allow the RAM 2214 to read out all or necessary parts of a file or database stored in an external recording medium, such as the hard disk drive 2224, the DVD-ROM drive 2226 (DVD-ROM 2201), and the IC card, to perform various types of processing for the data stored on the RAM 2214. The CPU 2212 then writes back the processed data in the external recording medium.

Various types of information such as various types of programs, data, tables, and databases may be stored in the storage medium for information processing. On the data read out from the RAM 2214, the CPU 2212 may perform various types of processing including various types of operations, information processing, condition determination, conditional branching, unconditional branching, and information retrieval/conversion, which are described anywhere in the present disclosure and specified by an instruction sequence of a program, and write back the result in the RAM 2214. The CPU 2212 may also retrieve information in a file or database in the recording medium. For example, when the recording medium stores a plurality of entries each having a first attribute value associated with a second attribute value, the CPU 2212 may retrieve an entry from the plurality of entries that satisfies a condition where the first attribute value is satisfied, read out the second attribute value stored in the entry, thereby obtaining the second attribute value associated with the first attribute value that satisfies a predetermined condition.

The programs or software modules described above may be stored on the computer 2200 or a computer-readable medium in the vicinity of the computer 2200. A storage medium such as a hard disk or RAM provided in a server system connected to a dedicated communication network or the Internet is usable as a computer-readable medium, thereby providing a program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: security system; 2: surveillance camera; 4: apparatus; 40: communication unit; 41: determination unit; 42: model; 43: instruction unit; 44: acquisition unit; 45: detection unit; 46: speech processing unit; 47: output unit; 2200: computer; 2201: DVD-ROM; 2210: host controller; 2212: CPU; 2214: RAM; 2216: graphics controller; 2218: display device; 2220: I/O controller; 2222: communication interface; 2224: hard disk drive 2226: DVD-ROM drive; 2230: ROM; 2240: I/O chip; 2242: keyboard

What is claimed is:
1. An apparatus comprising:
at least one processor;
a determination section of the at least one processor, when executed by the at least one processor, configured to determine a possibility of an abnormality of a subject based on images captured by a surveillance camera with an audio output function;

an instruction section of the at least one processor, when executed by the at least one processor, configured to instruct the surveillance camera to produce a non-speech alarm sound as audio toward the subject in response to the determination of the possibility of an abnormality;

an acquisition section of the at least one processor, when executed by the at least one processor, configured to acquire a reaction of the subject to the audio from the surveillance camera;

a detection section of the at least one processor, when executed by the at least one processor, configured to detect whether the subject has an abnormality or not based on the reaction of the subject to the audio and based on results of repeated processing performed by the instruction section and the acquisition section of the at least one processor to produce the audio toward the subject via the surveillance camera to acquire the reaction of the subject to the audio; and a speech processing section of the at least one processor, when executed by the at least one processor, configured to, in response to the detection by the detection section of the at least one processor that the subject has the abnormality, initiate speech between an operator of the apparatus and the subject via the surveillance camera, wherein the speech is initiated after the non-speech alarm sound.

2. The apparatus according to claim 1, further comprising:
an output section of the at least one processor, when executed by the at least one processor, configured to output an alert signal in response to the detection by the detection section of the at least one processor that the subject has the abnormality.

3. The apparatus according to claim 1, further comprising:
an output section of the at least one processor, when executed by the at least one processor, configured to output an alert signal in response to the detection by the detection section of the at least one processor that the subject has the abnormality.

4. The apparatus according to claim 1, wherein:
the instruction section of the at least one processor is further configured to instruct the surveillance camera to produce the audio to require the subject to take a certain action.

5. The apparatus according to claim 1, wherein:
the instruction section of the at least one processor is further configured to instruct the surveillance camera to produce the audio to require the subject to take a certain action.

6. The apparatus according to claim 4, wherein:
the detection section of the at least one processor is further configured to detect that the subject has the abnormality in accordance with the subject not taking the certain action.

7. The apparatus according to claim 4, wherein:
the certain action is an action to approach the surveillance camera.

8. The apparatus according to claim 6, wherein:
the certain action is an action to approach the surveillance camera.

9. The apparatus according to claim 4, wherein:
the certain action is an action to show a certificate to the surveillance camera.

10. The apparatus according to claim 6, wherein:
the certain action is an action to show a certificate to the surveillance camera.

11. The apparatus according to claim 9, wherein:
the detection section is further configured to detect that the subject has the abnormality in accordance with content of the certificate captured by the surveillance camera.

12. The apparatus according to claim 1, wherein:
the detection section is further configured to detect that the subject has the abnormality in accordance with the subject not being authorized to enter a surveillance area of the surveillance camera and to detect whether the subject has entered the surveillance area either intentionally or by accident.

13. The apparatus according to claim 1, wherein:
the instruction section of the at least one processor is further configured to determine the audio to be produced by the surveillance camera using a model trained by learning data including at least one of images or audio of the subject acquired from the surveillance camera and audio produced by a security guard toward the subject, wherein the model outputs a signal corresponding to the audio to be produced toward the subject in response to an input of at least one of the images or the audio of the subject.

14. A system comprising:
the apparatus according to claim 1; and
the surveillance camera configured to supply the captured images to the apparatus.

15. A method comprising:
determining a possibility of an abnormality of a subject based on images captured by a surveillance camera with an audio output function;

instructing the surveillance camera to produce a non-speech alarm sound as audio toward the subject in response to a determination of the possibility of the abnormality;

acquiring a reaction of the subject to the audio from the surveillance camera;

detecting whether the subject has the abnormality or not based on the reaction of the subject to the audio and based on results of repeated processing to produce the audio toward the subject via the surveillance camera to acquire the reaction of the subject to the audio; and in response to the detection that the subject has the abnormality, initiating speech between an operator of the surveillance camera and the subject via the surveillance camera, wherein the speech is initiated after the non-speech alarm sound.

16. A non-transitory storage medium with a program recorded therein, which is configured to cause at least one processor:

to determine, using the at least one processor, a possibility of an abnormality of a subject based on images captured by a surveillance camera with an audio output function;

to instruct, using the at least one processor, the surveillance camera to produce a non-speech alarm sound as audio toward the subject in response to the determination of the possibility of the abnormality;

to acquire, using the at least one processor, a reaction of the subject to the audio from the surveillance camera;

to detect, using the at least one processor, whether the subject has the abnormality or not based on the reaction of the subject to the audio and based on results of repeated processing to produce the audio toward the subject via the surveillance camera to acquire the reaction of the subject to the audio; and initiating speech, in response to the detection that the subject has the abnormality, between an operator of the surveillance camera and the subject via the surveillance camera, wherein the speech is initiated after the non-speech alarm sound.

\* \* \* \* \*